United States Patent [19]
Noguchi et al.

[11] 3,980,059

[45] Sept. 14, 1976

[54] INTERNAL COMBUSTION ENGINE

[75] Inventors: Masaaki Noguchi, Nagoya; Yukiyasu Tanaka, Okazaki; Setsuro Sekiya, Toyota, all of Japan

[73] Assignee: Toyota Jidosha Kogyo Kabushiki Kaisha, Japan

[22] Filed: June 6, 1974

[21] Appl. No.: 476,795

[30] Foreign Application Priority Data
June 8, 1973 Japan.................... 48-64501

[52] U.S. Cl. .................. 123/32 ST; 123/DIG. 4; 123/127; 123/188 VA
[51] Int. Cl.² ........................................ F02B 3/00
[58] Field of Search .......... 123/32 ST, 127, DIG. 4, 123/188 VA

[56] References Cited
UNITED STATES PATENTS

| | | | |
|---|---|---|---|
| 2,595,915 | 5/1952 | Barber | 123/32 ST |
| 2,803,230 | 8/1957 | Bensinger | 123/32 ST |
| 3,283,751 | 11/1966 | Goossak | 123/32 ST |
| 3,364,911 | 1/1968 | Baudry | 123/127 |
| 3,824,965 | 7/1974 | Clawson | 123/32 ST |

Primary Examiner—Charles J. Myhre
Assistant Examiner—Daniel J. O'Connor
Attorney, Agent, or Firm—Oblon, Fisher, Spivak, McClelland & Maier

[57] ABSTRACT

An internal combustion engine is designed to improve burning of the fuel therefor for reducing the harmful emissions in the exhaust gases thereof. An auxiliary combustion chamber is provided in the cylinder head being arranged to open toward the center of the cylinder through an orifice. A lean mixture fuel is introduced into a main combustion chamber formed by the cylinder walls, the cylinder head and the forward face of a piston reciprocable therein through a suction port curved for causing the lean mixture to swirl in one direction about the outer part of the main combustion chamber, and a rich mixture is introduced just in advance of a suction valve in said suction port which opens and closes communication between the suction port and the main combustion chamber upon actuation in a manner to swirl in a direction opposite to the lean mixture and near the center of the main combustion chamber. In compression, the rich mixture is thus drawn into the auxiliary combustion chamber where a spark plug ignites the same and fires the lean mixture in the main chamber by a flame jet of combustion passing through the orifice.

18 Claims, 5 Drawing Figures

INTERNAL COMBUSTION ENGINE

BACKGROUND OF THE INVENTION

The present invention relates generally to an internal combustion engine being designed to reduce the harmful emissions in the auto exhaust gas therefrom, and more specifically to an internal combustion engine having an improved mechanism for mixing air with the fuel being supplied thereto for the purpose of reducing such harmful emissions of the exhaust gas.

As one mode of burning fuel in internal combustion engines developed for the purpose of reducing the harmful auto emissions, various engines have been proposed under the designation of torch-ignition engines or stratified combustion engines.

In the typical torch-ignition engine, however, an auxiliary combustion chamber is provided separately from the main combustion chamber in the cylinder head and the auxiliary combustion chamber is equipped with its own suction hole or inlet and its own suction valve. A rich mixture taken in through this suction hole of the auxiliary combustion chamber when the suction valve thereof opens is introduced into the auxiliary combustion chamber, and this rich mixture is ignited by the spark plug. Using the torch of ignition, the mixture in the main combustion chamber, which is too lean to be ignited by an ordinary spark, is ignited, thereby reducing the harmful emissions due to the burning of the lean mixture. In this method, however, although the harmful emissions may reliably be reduced, it is unavoidable that the structure of the cylinder head becomes extremely complicated and accordingly expensive, primarily because the auxiliary combustion chamber required thereby has to be equipped with its own suction valve.

By contrast, in the typical stratified combustion engine, just short of the suction valve within the suction port opening in the combustion chamber, which is equivalent to the main combustion chamber, set up within the cylinder, a rich mixture must be introduced through an inlet path separately provided from the main suction path. This rich mixture layer is kept around the spark plug within the combustion chamber, while the lean mixture layer is kept outside and away from the rich mixture, and thereby the same effect being aimed at in the torch-ignition engine described hereinbefore, is attained. In the stratified combustion engine, the auxiliary combustion chamber is unnecessary and the cylinder head can be simplified, but on the other hand, it is extremely difficult to keep the rich mixture stratum within one area of the combustion chamber in the cylinder and the lean mixture in another area. Thus, it is difficult to practicably apply this engine as an automobile internal combustion engine which has to be operated over a wide range from low to high speeds and to secure the effect of reducing the harmful emissions in the exhaust gas being emitted therefrom.

SUMMARY OF THE INVENTION

Accordingly, a primary object of the present invention is to eliminate the shortcomings and retain the meritorious features of the aforementioned examples of engines, that is to provide an internal combustion engine wherein, separately from the lean mixture which is supplied swirlingly to the cylinder, a rich mixture is supplied to the cylinder, and through ignition of this rich mixture, more perfect combustion of the supplied fuel may be realized.

Another object of the present invention is to provide an improved internal combustion engine wherein the mechanism of the auxiliary combustion chamber in the typical torch-ignition engine is organically coupled with the rich mixture introducing path of the typical stratified combustion engine.

Still another object of the present invention is to provide an internal combustion engine wherein a layer of rich mixture is formed at the center of the cylinder and is surrounded by a swirling stream of lean mixture and in the compression stroke, a part of the rich mixture at the center of cylinder is forced into an auxiliary combustion chamber for effective ignition and combustion.

Still another object of the present invention is to provide an improved internal combustion chamber having a cylinder head of simplified construction.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several figures, and in which.

DESCRIPTION OF THE ILLUSTRATED EMBODIMENTS

Figure 1:
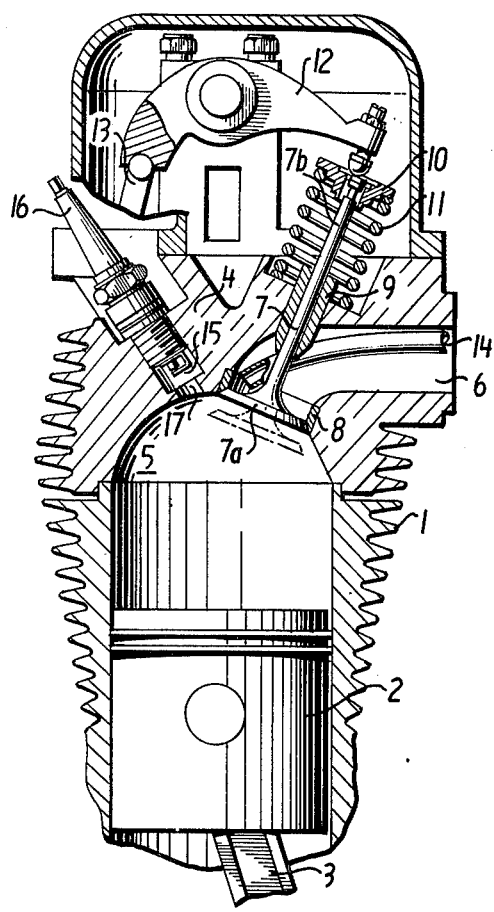
FIG. 1 is a sectional view schematically showing an engine as one embodiment of the present invention.

In a first embodiment of this invention illustrated in FIG. 1, a cylinder 1 is shown having fins disposed on the outer surface thereof for improving the cooling effect therein. A piston 2 is fitted in the cylinder 1 to reciprocate therein. One end of the piston 2 is connected via a connecting rod 3 with a crank mechanism, not shown, and the reciprocating motion of the piston 2 is converted into rotational motion of a crank shaft, not shown, through this crank mechanism. A cylinder head 4 located at the top of the cylinder 1 has a part thereof which faces the inside of the cylinder 1, and which, together with the inside surface of the cylinder 1 and the forward face of the piston 2, defines a main combustion chamber 5.

On the outer surface of the cylinder head 4 are formed fins similar to those on the exterior of the cylinder 1. A suction port 6 is formed in the cylinder head 4 which communicates with the main combustion chamber 5, the communicating path containing a suction valve 7 and a valve seat 8 therefor, and by the open-close action of the suction valve 7, the suction port 6 is opened or closed to the main combustion chamber 5.

Figure 2A:
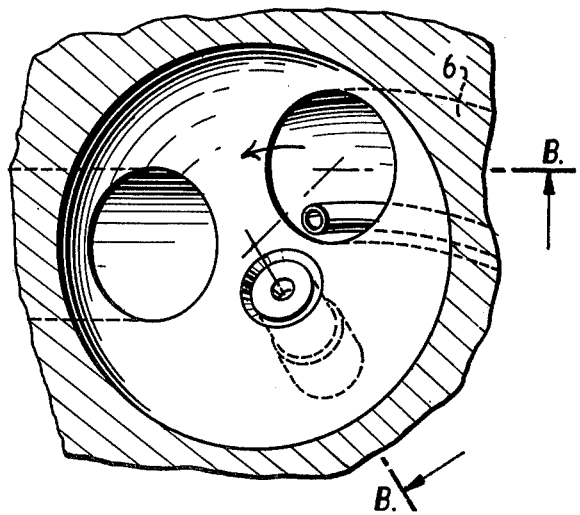
FIG. 2A is an enlarged view of the essential elements in one embodiment of the present invention.
Figure 2B:
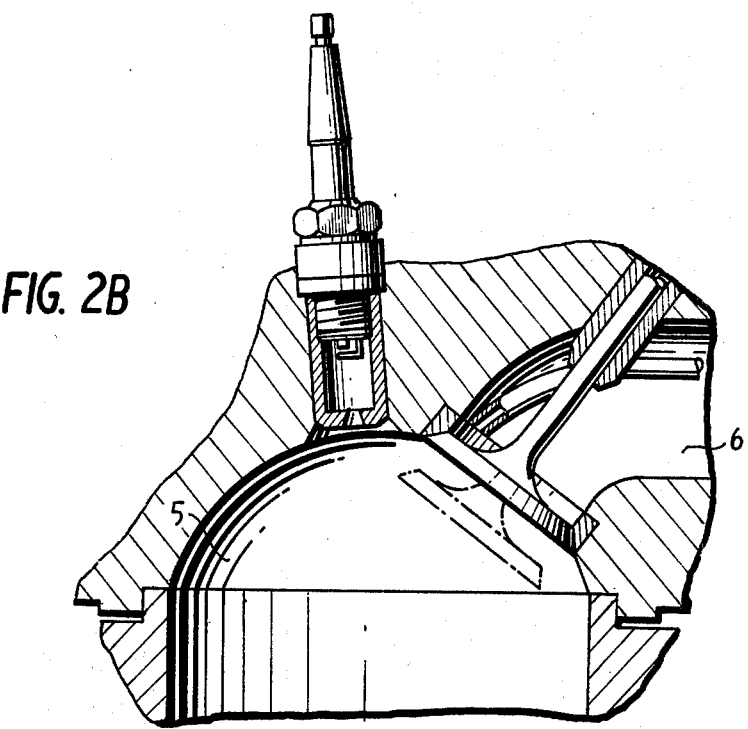
FIG. 2B is a sectional view taken along the line B—B.

The suction valve 7 consists of an umbrella valve 7a and a stem 7b. The valve seat 8 therefor cooperates with the valve 7a to open or close the suction port 6 and the tip of the stem 7b protrudes through a bushing 9 in the top of the cylinder head 4. At this tip there is installed a spring retainer 10, between which and the cylinder head 4 there is disposed a valve spring 11. Also at the tip of the stem 7b is linked a rocker arm 12. The rocker arm 12, when connected with the crankshaft through a push rod 13 and a cam shaft, not shown, causes the suction valve 7 to open or close, depending on the rotation of the crankshaft, or the reciprocation of the piston 2, thereby opening or closing the suction port 6. The suction port 6, on the other hand, communicates with the carburetor and the air-cleaner, not shown, and serves to introduce a mixture of fuel and air with reduced content of fuel into the main combustion chamber 5. As illustrated in FIG. 2, the suction port 6 is so curved that in the suction stroke it can cause the lean mixture sucked into the cylinder to swirl vigorously in the direction indicated by an arrow. This swirling persists in the combustion chamber 5, even at the end of the compression stroke.

In FIG. 1, a passage 14 is shown being housed in the suction port 6, wherein the passage 14 opens just in advance of the location of the suction valve 7 and toward the center of swirling of the swirling lean mixture and in a direction slightly against the flow of such swirling lean mixture. The passage 14 communicates with the carburetor and the air-cleaner, not shown, and serves to introduce an enriched mixture from the carburetor, to the suction port 6 just before the suction valve 7a and near the center of the swirling lean mixture flow, when the suction valve is open.

An auxiliary combustion chamber 15 is installed within the cylinder 4 such that its axis may be directed toward the center of the cylinder. The auxiliary combustion chamber 15 is formed by gouging out the cylinder head 4 from the outside in the direction of the main combustion chamber 5 such that it is shaped like a pillar having a bottom. In this auxiliary combustion chamber 15, a spark plug 16 is disposed in such a manner as to cover up the portion gouged out from the exterior wall. An orifice 17 formed in the axial direction of the auxiliary combustion chamber 15 provides communication of the auxiliary combustion chamber with the main combustion chamber 5, the orifice 17 opening in the vicinity of the swirling center of the lean mixture. In addition to the above, an exhaust port and an exhaust valve are provided in the cylinder head 4, but their description is omitted since their constructions are substantially the same as those of the suction port and the suction valve, and are not different from known prior art arrangements.

In the operation of the engine, in the suction stroke of the piston 2, the suction valve 7 is opened through the connecting rod 3, the crankshaft and the camshaft, not shown, the pushing rod 13 and the rocker arm 12, whereby the suction port 6 is opened to the main combustion chamber 5. The lean mixture is thus sucked, or drawn, into the main combustion chamber 5 through the suction port 6, as indicated by the arrow in FIG. 2A, and into the cylinder as a swirling stream. Meanwhile, the rich mixture being introduced through the passage 14 is sucked through the opening thereof in the suction port 6 into nearly the center of this swirling stream in the cylinder. In other words, the outer region within the cylinder is constituted by a swirling stream of lean mixture and the inner region is constituted by a rich mixture.

When the piston 2 comes into the compression stroke, the suction valve 7 is forced back to a closed position by the valve spring 11, thereby closing the suction port 6. Thus, as the piston 2 rises, the stratified mixtures within the main combustion chamber 5 are compressed. Stratification due to swirling persists effectively even toward the end of the compression stroke. Meanwhile, in the compression stroke, a part of the rich mixture effectively held around the center of the cylinder is forced into the auxiliary combustion chamber 15 through the orifice 17, where the rich mixture mixes with the residual gas staying in the auxiliary combustion chamber 15, and as a result, a relatively rich mixture stagnates around the spark plug. The other part of the relatively rich mixture stagnates outside of the orifice 17 and within the auxiliary combustion chamber 15. Spark ignition then takes place through the spark plug 16 with optimum timing. The relatively rich mixture in the auxiliary combustion chamber burns and, in the form of a torch flame jet, it spurts through the orifice 17 into the stagnant rich mixture in the main combustion chamber 5. Thus, the lean mixture being stratified around the rich mixture gets ignited and comes to be perfectly burned, though it would misfire in the conventional gasoline engine.

In this way, combustion takes place in three stages, first by ignition in the auxiliary combustion chamber 15, then through burning and spreading of a rich mixture around the orifice 17, and consequently, by burning of the lean mixture in the main combustion chamber 5. Thereafter, expansion and exhaustion follow just as in the conventional four-cycle engine, thereby completing the four cycles.

In one example, wherein the air/fuel ratio of the lean mixture to be sucked into the main combustion chamber 5 through the suction port 6 was set at 20–30, the air/fuel ratio of the rich mixture to be sucked into the main combustion chamber 5 through the passage 14 was set at 2–6 and the flow rate ratio between the two mixtures rich mixture/rich and lean mixture was set at 0.03 – 0.10, excellent combustion was reliably achieved, even in the lean range, wherein misfiring would occur in conventional gasoline engines, and the harmful elements in the exhaust were drastically reduced.

Thus, with the present invention, in which an auxiliary combustion chamber 15 is installed, suction of a rich mixture into the auxiliary combustion chamber 15 takes place through the suction valve 7 provided in the suction port 6 for introduction of the lean mixture into the main combustion chamber 5. The distinctive features of the present invention therefore lie in the fact that no specially constructed suction valve need be provided in the auxiliary combustion chamber 15, forced swirling of the stream occurring in the suction stroke is utilized for stratification of the lean and rich mixtures, and even a mixture so lean as normally to be unable to be burned on account of misfiring in conventional gasoline engines can be reliably ignited and substantially perfectly burned, thereby significantly reducing the amount of harmful elements in the exhaust gases. It goes without saying that there can be embodiments of the present invention other than the one described above which will not forfeit any of these features.

Figure 3A:
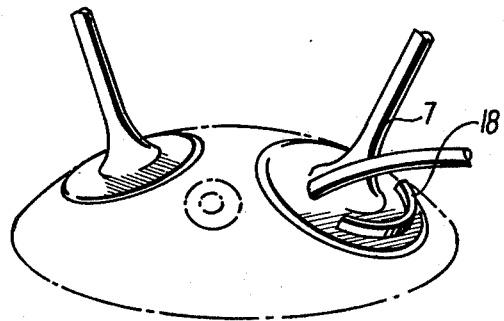
FIG. 3A is an enlarged view taken along an oblique line of the essentials in another embodiment of the invention and FIG. 3B is a schematic plan view thereof.
Figure 3B:
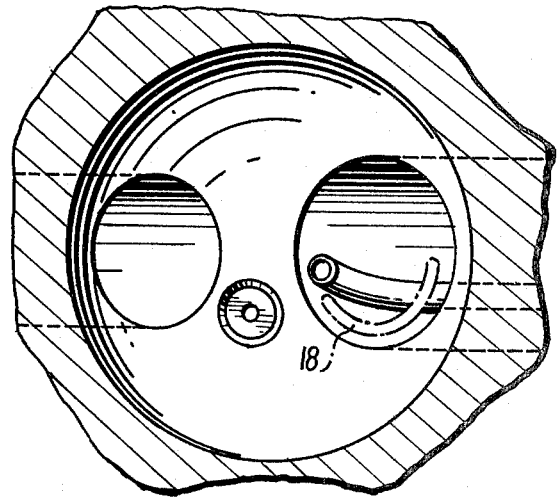

In the embodiment already described, forced swirling of a lean mixture is caused by the profile of the suction port 6. In the example illustrated in FIG. 3A, 3B, the suction valve 7 is equipped with a shroud 18, which causes forced swirling of the lean mixture in the suction stroke. Performance in the second example is practically the same as in the first example, and a detailed description is therefore omitted here.

In the internal combustion engine of the present invention, in which a relatively rich mixture easy to ignite is generated in the auxiliary combustion chamber, this mixture is ignited by spark and the torch flame caused thereby is introduced into the main combustion chamber, wherein even the mixture therein which is too lean to be ignited by conventional sparking can thus be fired to burn normally. Thus, the present invention is characterized by the excellent effects of significantly reducing the amount of the harmful elements in the exhaust gases through substantially perfect burning of the lean mixture, and dispensing with any special suction valve in the auxiliary combustion chamber, because introduction of the mixture into the auxiliary combustion chamber is done through the suction valve provided to draw the lean mixture into the main combustion chamber, and thereby being able to realize the reduction of the harmful elements without complicating the structure of the cylinder head.

Obviously, many modifications and variations are possible in light of these teachings. It therefore is to be understood that within the scope of the appended claims, the invention may be practiced otherwise than as specifically described herein.

What is claimed as new and desired to be secured by Letters Patent of the United States is:

1. An internal combustion engine comprising:
   a main combustion chamber;
   an auxiliary combustion chamber having an orifice through which said auxiliary combustion chamber communicates with said main combustion chamber;
   a suction port means in communication with said main combustion chamber for introducing a lean mixture thereto;
   means in association with said suction port for causing said lean mixture to swirl in said main combustion chamber in such a manner that the center of the swirling of said lean mixture is formed in the vicinity of said orifice; and
   a suction passage means located within said suction port means for introducing a rich mixture into said main combustion chamber and toward said center of said swirling, whereby a rich mixture zone is formed in the vicinity of said orifice and a lean mixture zone is formed around said rich mixture zone;
   whereby at least a portion of said rich mixture is introduced through said orifice into said auxiliary combustion chamber during a compression stroke of said internal combustion engine.

2. An internal combustion engine according to claim 1, further comprising:
   a suction valve having a valve head for opening and closing said suction port.

3. An internal combustion engine according to claim 2, wherein:
   said means is disposed in said suction valve.

4. An internal combustion engine according to claim 3, wherein:
   said means is disposed in said valve head.

5. An internal combustion engine according to claim 3, wherein:
   said means is a shroud disposed in the back face of said valve head.

6. An internal combustion engine according to claim 1, wherein:
   said suction passage is disposed within said suction port,
   whereby said rich mixture is introduced into said main combustion chamber when said suction valve is open.

7. An internal combustion engine comprising:
   a main combustion chamber;
   an auxiliary combustion chamber having an orifice through which said auxiliary combustion chamber communicates with said main combustion chamber;
   a suction port means in communication with said main combustion chamber for introducing a lean mixture thereto, said suction port being so constructed in association with said main combustion chamber that said port causes said lean mixture to swirl in said main combustion chamber in such a manner that the center of the swirling of said lean mixture is formed in the vicinity of said orifice; and
   a suction passage means located within said suction port means for introducing a rich mixture into said main combustion chamber and toward said center of said swirling, whereby a rich mixture zone is formed in the vicinity of said orifice and a lean mixture zone is formed around said rich mixture zone;
   whereby at least a portion of said rich mixture is introduced through said orifice into said auxiliary combustion chamber during a compression stroke of said internal combustion engine.

8. An internal combustion engine according to claim 7, wherein:
   said suction port is so curved that it causes said lean mixture to swirl.

9. An internal combustion engine according to claim 7, wherein:
   said suction port is so connected to said main combustion chamber that the direction of said suction port is substantially tangential to the periphery of said main combustion chamber.

10. An internal combustion engine comprising:
    a cylinder;
    a cylinder head;
    a piston disposed within said cylinder;
    a main combustion chamber defined by said cylinder, said cylinder head and said piston;
    an auxiliary combustion chamber having an orifice through which said auxiliary combustion chamber communicates with said main combustion chamber, said orifice being disposed in the vicinity of the central axis of said cylinder;
    a suction port means in communication with said main combustion chamber for introducing a lean mixture thereto, said suction port being so disposed in association with said main combustion chamber that said port causes said lean mixture to swirl around said central axis of said cylinder;
    a suction valve disposed in said suction port;
    a suction passage means located within said suction port means having an open end thereof directed to the vicinity of the central axis of said cylinder for introducing a rich mixture into said main combustion chamber, toward said center of said swirling, whereby a rich mixture zone is formed in the vicinity of said orifice and a lean mixture zone is formed around said rich mixture zone;

whereby at least a portion of said rich mixture is introduced through said orifice into said auxiliary combustion chamber during a compression stroke of said internal combustion engine.

11. An internal combustion engine according to claim 10, wherein:
said suction port opens in a tangential direction with respect to the inner wall of said cylinder.

12. An internal combustion engine according to claim 10, wherein:
said suction passage has said open end within said suction port,
whereby said rich mixture is introduced into said main combustion chamber when said suction valve is open.

13. An internal combustion engine according to claim 10, wherein:
said open end of said suction passage is directed in a direction opposite to the swirling direction of said lean mixture.

14. An internal combustion engine according to claim 10, wherein:
said cylinder head has a semispherical shape; and
said auxiliary combustion chamber is disposed in the vicinity of the vertex of said semispherical main combustion chamber.

15. An internal combustion engine comprising:
a cylinder;
a cylinder head;
a piston disposed within said cylinder;
a main combustion chamber defined by said cylinder, said cylinder head and said piston;
an auxiliary combustion chamber having an orifice in communication with said main combustion chamber, said orifice being disposed in the vicinity of the central axis of said cylinder;
a suction port means in communication with said main combustion chamber for introducing a lean mixture thereto;
a suction valve disposed in said suction port and having a valve head provided with a shroud thereon for causing said lean mixture to swirl around the central axis of said cylinder;
a suction passage means located within said suction port means having an open end thereof directed to the vicinity of the central axis of said cylinder for introducing a rich mixture into said main combustion chamber, toward said center of said swirling, whereby a rich mixture zone is formed in the vicinity of said orifice and a lean mixture zone is formed around said rich mixture zone;
whereby at least a portion of said rich mixture is introduced through said orifice into said auxiliary combustion chamber during a compression stroke of said internal combustion engine.

16. An internal combustion engine according to claim 15, wherein:
said shroud is disposed in the back face of said valve head.

17. An internal combustion engine according to claim 15, wherein:
said suction passage has said open end within said suction port,
whereby said rich mixture is introduced into said main combustion chamber when said suction valve is open.

18. An internal combustion engine according to claim 15, wherein:
said open end of said suction passage is directed in a direction opposite to the swirling direction of said lean mixture.

* * * * *